(12) United States Patent
Chong et al.

(10) Patent No.: US 6,912,433 B1
(45) Date of Patent: Jun. 28, 2005

(54) DETERMINING A NEXT TOOL STATE BASED ON FAULT DETECTION INFORMATION

(75) Inventors: Robert J. Chong, Austin, TX (US); Michael L. Miller, Chicago, IL (US); Alexander J. Pasadyn, Austin, TX (US); Eric O. Green, Austin, TX (US)

(73) Assignee: Advanced Mirco Devices, Inc., Austin, TX (US)

( * ) Notice: Subject to any disclaimer, the term of this patent is extended or adjusted under 35 U.S.C. 154(b) by 231 days.

(21) Appl. No.: 10/323,554

(22) Filed: Dec. 18, 2002

(51) Int. Cl.[7] ............................................. G06F 19/00
(52) U.S. Cl. ..................................................... 700/110
(58) Field of Search .................... 700/28–34, 108–111, 700/117–121, 174–177; 702/189–197, 81–84, 57–59, 182–185

(56) References Cited

U.S. PATENT DOCUMENTS

| | | | | |
|---|---|---|---|---|
| 5,408,405 A | * | 4/1995 | Mozumder et al. ........... 700/31 |
| 5,646,870 A | * | 7/1997 | Krivokapic et al. ........... 716/4 |
| 5,896,294 A | * | 4/1999 | Chow et al. ................. 700/121 |
| 6,161,054 A | * | 12/2000 | Rosenthal et al. .......... 700/121 |
| 6,285,971 B1 | * | 9/2001 | Shah et al. ..................... 703/2 |
| 6,366,822 B1 | * | 4/2002 | Heavlin ........................ 700/31 |
| 6,405,096 B1 | * | 6/2002 | Toprac et al. ............... 700/121 |
| 6,490,497 B1 | * | 12/2002 | Mitsuhashi et al. ......... 700/121 |
| 6,510,354 B1 | * | 1/2003 | Lin ............................. 700/55 |
| 6,535,783 B1 | * | 3/2003 | Miller et al. ................ 700/121 |
| 6,556,881 B1 | * | 4/2003 | Miller ......................... 700/108 |
| 6,560,503 B1 | * | 5/2003 | Toprac et al. ............... 700/108 |
| 6,587,744 B1 | * | 7/2003 | Stoddard et al. ............ 700/121 |
| 6,609,036 B1 | * | 8/2003 | Bickford ....................... 700/30 |
| 6,687,561 B1 | * | 2/2004 | Pasadyn et al. ............. 700/110 |
| 6,697,697 B2 | * | 2/2004 | Conchieri et al. .......... 700/121 |
| 6,708,073 B1 | * | 3/2004 | Heavlin ...................... 700/121 |
| 6,725,402 B1 | * | 4/2004 | Coss et al. .................... 714/48 |
| 6,738,682 B1 | * | 5/2004 | Pasadyn ..................... 700/100 |
| 6,757,569 B2 | * | 6/2004 | Lin ............................. 700/29 |
| 6,757,579 B1 | * | 6/2004 | Pasadyn ..................... 700/108 |
| 6,766,214 B1 | * | 7/2004 | Wang et al. ................ 700/121 |
| 2004/0093107 A1 | * | 5/2004 | Good et al. ................. 700/108 |

* cited by examiner

Primary Examiner—Maria N. Von Buhr
(74) Attorney, Agent, or Firm—Williams, Morgan & Amerson, P.C.

(57) ABSTRACT

A method and apparatus are provided for determining a next tool state based on fault detection information. The method comprises receiving operational data associated with processing of a workpiece by a processing tool, determining at least a portion of noise associated with the processing of the workpiece based on analyzing the operational data and estimating a next state of the processing tool based on at least the determined portion of the noise.

26 Claims, 2 Drawing Sheets

DETERMINING A NEXT TOOL STATE BASED ON FAULT DETECTION INFORMATION

BACKGROUND OF THE INVENTION

1. Field of the Invention

This invention relates generally to an industrial process, and, more particularly, to determining a next state of a processing tool in a semiconductor fabrication process based on fault detection information.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in continual improvements in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

During the fabrication process, various events may take place that affect the performance of the devices being fabricated. That is, variations in the fabrication process steps may result in device performance variations. Factors, such as feature critical dimensions, doping levels, contact resistance, particle contamination, etc., all may potentially affect the end performance of the device. Various tools in the processing line are controlled, in accordance with performance models, to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

Run-to-run control in semiconductor manufacturing is a type of batch control, where a batch may be as small as one wafer or as large as several lots of wafers. The standard output of a run-to-run controller is a process recipe. This recipe defines the set points for "low-level" controllers built into the processing tool. In this way, the run-to-run controller supervises the tool controller by specifying required values for process variables such as temperature, pressure, flow, and process time. The tool controller handles the actuations necessary to maintain these variables at the requested values. A typical run-to-run control setup includes a feedback loop where adjustments are made to the recipe parameters based on batch properties measured after processing. Typically, the job of the run-to-run controller is to ensure that each batch hits its inline target values. Inline targets refer to measurements that are taken while the wafers have only completed some of their processing steps. The inline targets are designed to provide guidelines for having functional parts at the end of the manufacturing line.

Because the process states and other variables in the manufacturing processes can change over time, a successful controller should adapt to changing process conditions. At the foundation of such an adaptive controller are system identification techniques that aim to determine a model with the same input-output characteristics and possibly the same natural model structure as the physical system under study. In many practical applications, it is not feasible to obtain an exact model form for the process under study in part due to unpredictability of noise. Thus, online system identification often takes the form of a parameter estimation problem. In this formulation, a form for the model is predetermined, and the model parameters are updated recursively from process data. Changing process conditions can be seen as a change in the estimated model parameters over time or controller runs.

To achieve adequate performance in an uncertain environment, the control system should be able to, to the extent possible, take into account the noise present in the process and metrology system. The noise may be due to process disturbances, power instability, variations in measurements, and numerous other sources. Traditionally, covariance matrices have been utilized to account for variations in the process. These matrices, however, are commonly static, and thus are not updated to account for changes (e.g., introduction or presence of noise) in the process. Without a revised or updated covariance matrix, a self-adaptive controller may not accurately estimate the next process state or tool state, which may result in an increased number of misprocessed wafers.

The present invention is directed to overcoming, or at least reducing the effects of, one or more of the problems set forth above.

SUMMARY OF THE INVENTION

In one embodiment of the present invention, a method is provided for determining a next tool state based on fault detection information. The method comprises receiving operational data associated with processing of a workpiece by a processing tool, determining at least a portion of noise associated with the processing of the workpiece based on analyzing the operational data and estimating a next state of the processing tool based on at least the determined portion of the noise.

In another embodiment of the present invention, an apparatus is provided for determining a next tool state based on fault detection information. The apparatus comprises an interface communicatively coupled to a control unit. The interface is adapted to receive operational data associated with processing of a workpiece by a processing tool. The control unit is adapted to determine at least a portion of noise associated with the processing of the workpiece based on analyzing the operational data and estimate a next state of the processing tool based on at least the determined portion of the noise.

In a further embodiment of the present invention, an article comprising one or more machine-readable storage media containing instructions is provided for determining a next tool state based on fault detection information. The one or more instructions, when executed, enable the processor to receive operational data associated with processing of a workpiece by a processing tool, adjust one or more noise parameters associated with the processing of the workpiece based on analyzing the operational data and estimate a next state of the processing tool based on at least the one or more adjusted noise parameters.

In a further embodiment of the present invention, a system is provided for determining a next tool state based on fault detection information. The system comprises a processing tool and a control unit. The processing tool is adapted to provide operational data associated with processing of a workpiece. The control unit is adapted to receive the operational data, determine at least a portion of noise associated with the processing of the workpiece based on analyzing the operational data, and estimate a next state of the processing tool based on at least the determined portion of the noise.

BRIEF DESCRIPTION OF THE DRAWINGS

The invention may be understood by reference to the following description taken in conjunction with the accompanying drawings, in which like reference numerals identify like elements, and in which.

Figure 1:
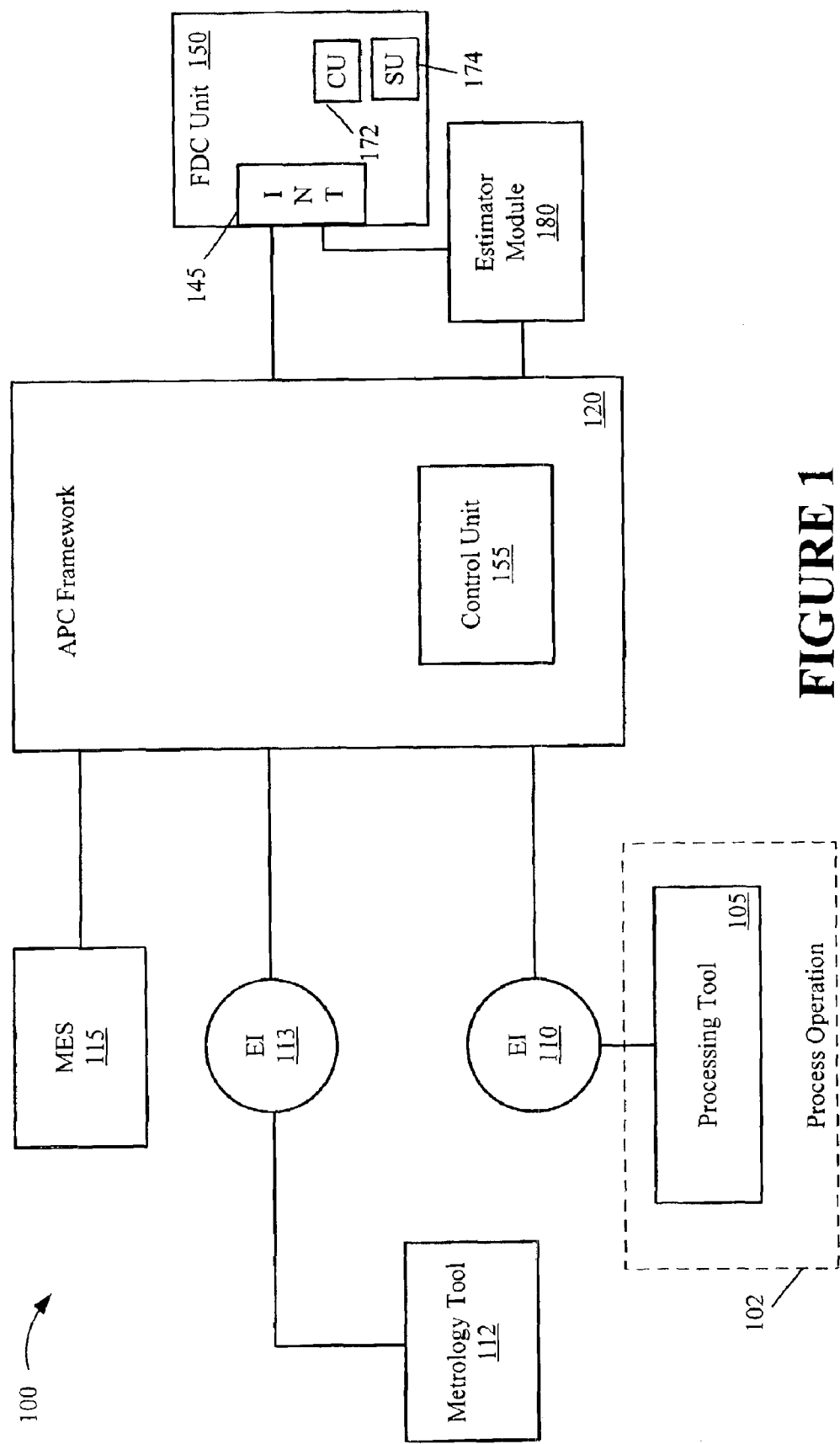
FIG. 1 illustrates an industrial system, including an APC framework, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a block diagram of a system 100 is illustrated, in accordance with one embodiment of the present invention. The system 100, in the illustrated embodiment, includes at least one process operation 102 that may be part of an industrial process, such as a semiconductor fabrication process, a photographic process, a chemical process, or any other process in which a plurality of variables, such as temperature, tool parameters, pressure level and chemical compositions, and the like may be monitored and analyzed. The variables may be monitored and analyzed, for example, to detect faults and/or classify the detected faults.

In the system 100, the process operation 102 may be performed using one or more processing tools 105. Generally, the particular type of process operation 102 that is performed, and the type of processing tool(s) 105 employed in that process operation 102, depend on the particular implementation. For example, in the context of a chemical industrial process, the process operation 102 may include processing a polymer. In the context of a photographic process, the process operation 102 may, for example, include processing a film.

For illustrative purposes, the process operation 102 depicted in FIG. 1 is at least a portion of a semiconductor fabrication process, which, for example, may be part of an overall semiconductor process flow. The processing tool 105, in the illustrated embodiment, may take the form of any semiconductor fabrication equipment used to produce a processed workpiece, such as a silicon wafer. The semiconductor process may be utilized to produce a variety of integrated circuit products including, but not limited to, microprocessors, memory devices, digital signal processors, application specific integrated circuits (ASICs), or other similar devices. An exemplary processing tool 105 may include an exposure tool, an etch tool, a deposition tool, a polishing tool, a rapid thermal anneal processing tool, a test-equipment tool, an ion implant tool, a packaging tool and the like. It should be appreciated that the processing tool 105 need not necessarily be limited to the processing of silicon wafers, but may produce a variety of different types of commercial products without departing from the spirit and scope of the present invention.

In the system 100 of FIG. 1, the processing tool 105 has an associated equipment interface 110, and a metrology tool 112 has an associated equipment interface 113, for interfacing with an Advanced Process Control (APC) framework 120. In the illustrated embodiment, the metrology tool 112 measures aspects of the workpieces that are processed in the process operation 102. The metrology tool 112 may provide wafer-related data that characterizes the quality of the wafer that is processed by the processing tool 105. The wafer product data can be generated from specific quantitative and/or qualitative measurements that are taken from the wafer by the metrology tool 112. For example, the wafer product data may include film thickness measurements, line width measurements, and/or overlay offset measurements of the wafer. It will be appreciated that these specific measurements that define the wafer product data arc merely exemplary. Accordingly, various other measurements may also be taken to determine whether the wafers that are being processed by the processing tool 105 possess the quantitative or qualitative characteristics desired. The specific manner in which the wafer product data is obtained by the metrology tool 112 is well known to those of ordinary skill in the art and the details of such will not be discussed herein to avoid unnecessarily obscuring the present invention.

The equipment interface 113 may receive metrology data from the metrology tool 112 and communicate this data to the APC framework 120, which may include a control unit 155 for managing at least the overall operations of the APC framework 120. In addition, the processing tool 105 or a sensor external (not shown) to the processing tool 105 may provide data related to the processing of the semiconductor wafers to the APC framework 120. The metrology data or any other data related to the processing of the semiconductor wafers is hereinafter referred to as "operational data."

The manufacturing system 100 may include a manufacturing execution system (MES) 115 that is coupled to the APC frame work 120. The manufacturing execution system 115 may, for example, determine the processes that are to be performed by the processing tool 105, when these processes arc to be performed, how these processes are to be performed, etc. In the illustrated embodiment, the manufacturing execution system 115 manages and controls the overall system through the APC framework 120. The process control unit 155 of the APC framework 120, in one embodiment, aids the processing tool 105, through a feedback (or feed forward) process, towards performing a desired process to thereby achieve a desired result.

An exemplary APC framework 120 that may be suitable for use in the manufacturing system 100 may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The system 100, in the illustrated embodiment, includes a fault detection and classification (FDC) unit 150 that is coupled to the APC framework 120 via an interface 145. The interface 145 may be any acceptable structure(s) that allow(s) the FDC unit 150 to communicate with other devices. The FDC unit 150 includes a control unit 172 for managing the overall operations and executing one or more software applications resident in a storage unit 174.

The FDC unit 150, in one embodiment, detects faults associated with the processing tool 105. In another embodiment, the FDC unit 150 may classify one or more of the detected faults. Although in the illustrated embodiment, the FDC unit 150 detects faults at the "tool" level, in alternative embodiments, the FDC unit 150 may detect faults at any desirable level, including at a sensor level, process level, system level, and the like.

Faults may occur in a manufacturing process for various reasons, including occurrence of an unknown disturbance, hardware failure, depletion of resources (e.g., gases, liquids, chemicals), and the like. The faults may be detected in several ways, including detecting a fault based on analyzing metrology data provided by the metrology tool 112 and/or trace data provided by the processing tool 105. Trace data may include data provided from one or more sensor(s) (not shown) of the processing tool 105. The FDC unit 150, for example, may detect a fault associated with the processing tool 105 if the received metrology data indicates that values measured from the wafers are outside an acceptable range. The FDC unit 150, in another embodiment, may also detect a fault based on comparing the received trace data from the processing tool 105 to fault model data. The fault model data includes operational data of other similar-type tools, where it was previously known that such tools had operated within acceptable operational limits.

As described in more detail below, in accordance with one or more embodiments of the present invention, the results from the FDC unit 150 are provided to an estimator module 180, which estimates the next tool state of the processing tool 105 (or the next processing state) based in part on the FDC results. In particular, based on the information provided by the FDC unit 150, the estimator module 180 is able to take into account the presence of noise (or at least a portion thereof) in the process operation 102 when estimating the next tool state, thereby achieving more accurate tool state estimates. The estimated next tool state is provided to the control unit 155, which then generates the next control move for the processing tool 105 based on the estimated next tool state. For example, in the context of a etching process, the estimator module 180 may estimate an etch rate of the processing tool 105 based on the information provided by the FDC unit 150, and then provide the estimated etch rate to the control unit 155, which then determines an etch time (ie., control move) that the processing tool 105 should etch the next wafer.

The estimator module 180, in one embodiment, uses a state space model that describes the system dynamics. For illustrative purposes, it is herein assumed that the processing tool 105 is an etching tool, and that the dynamic behavior of the etch-rates of the processing tool 105 can be described using a linear state space model shown in equations (1) and (2):

$$x_{k+1} = Ax_k + v_k, \tag{1}$$

$$y_k = Cx_k + w_k, \tag{2}$$

where exemplary values of A and C may be $$A = \begin{bmatrix} 1 & 1 \\ 0 & 1 \end{bmatrix}$$

and C=[1 0]

In the illustrated example, $x_k$ comprises two states, an etch-rate state, and a slope of the drift state, $y_k$ represents the output measurement, $v_k$ represents the process noise term, and $w_k$ represents the measurement noise.

The estimator module 180 in the illustrated embodiment includes a Kalman filter for predicting the next state of the processing tool 105 or predicting the next processing state. Although not so limited, for ease of illustration, it is herein assumed that the Kalman filter predicts the next state of the processing 105. The Kalman filter may be utilized to reduce the covariance of the estimated error. The general form of the steady-state Kalman filter is illustrated by equation (3):

$$\hat{x}_{k+1} = A\hat{x}_k + L(y_k - C\hat{x}_k), \tag{3}$$

where L is the Kalman filter gain, which can be calculated by solving the Algebraic Riccati Equation (ARE) for P, where P is defined by equations (4) and (5):

$$P = A(P - PC^T(R + CPC^T)^{-1}CP)A^T + Q, \tag{4}$$

$$L = APC^T(R + CPC^T)^{-1}, \tag{5}$$

In the illustrated example, the Q and R matrices are covariance matrices, which describe the noise terms associated with the process or process operation 102 and metrology.

In estimating the next state of the processing tool 105, the Kalman filter of the estimator module 180 takes into account the noise terms, such as process noise and metrology noise, using the Q and R covariance matrices. In the illustrated example, the Q matrix relates to the measurement noise (e.g., measurement error due to a metrology tool, human, and the like) and the R matrix relates to the process noise (e.g., step disturbance, power instability, and the like). The size of the Q and R matrices may vary (e.g., 2×2, 4×4, 100×100 matrices), depending on how many inputs and outputs are monitored for a given process. In the Q and R matrices, a different priority number (or value) may be assigned to a process input to account for the noise associated with that input. In accordance with one embodiment of the present invention, the elements of the Q and R matrices may be adjusted dynamically based on the information provided by a fault detection and classification (FDC) unit 150.

It should be appreciated that the illustrated components shown in the block diagram of the system 100 in FIG. 1are illustrative only, and that, in alternative embodiments, additional or fewer components may be utilized without deviating from the spirit or scope of the invention. For example, in one embodiment, the MES 115 may interface with the APC framework 120 through an associated equipment interface (not shown). Furthermore, in one embodiment, the various components of the system 100, such as the tools 105, 112 may interface with the APC framework 120 through a common equipment interface. Additionally, it should be noted that although various components, such as the equipment interfaces 110, 113 of the system 100 of FIG. 1 are shown as stand-alone components, in alternative embodiments, such components may be integrated into the processing tools 105 or metrology tool 112. Furthermore, selected elements of the system 100, such as the control unit 155 and the estimator module 180, may be implemented in a same device. In one embodiment, the system 100 of FIG. 1 may be implemented without an APC framework 120.

Figure 2:
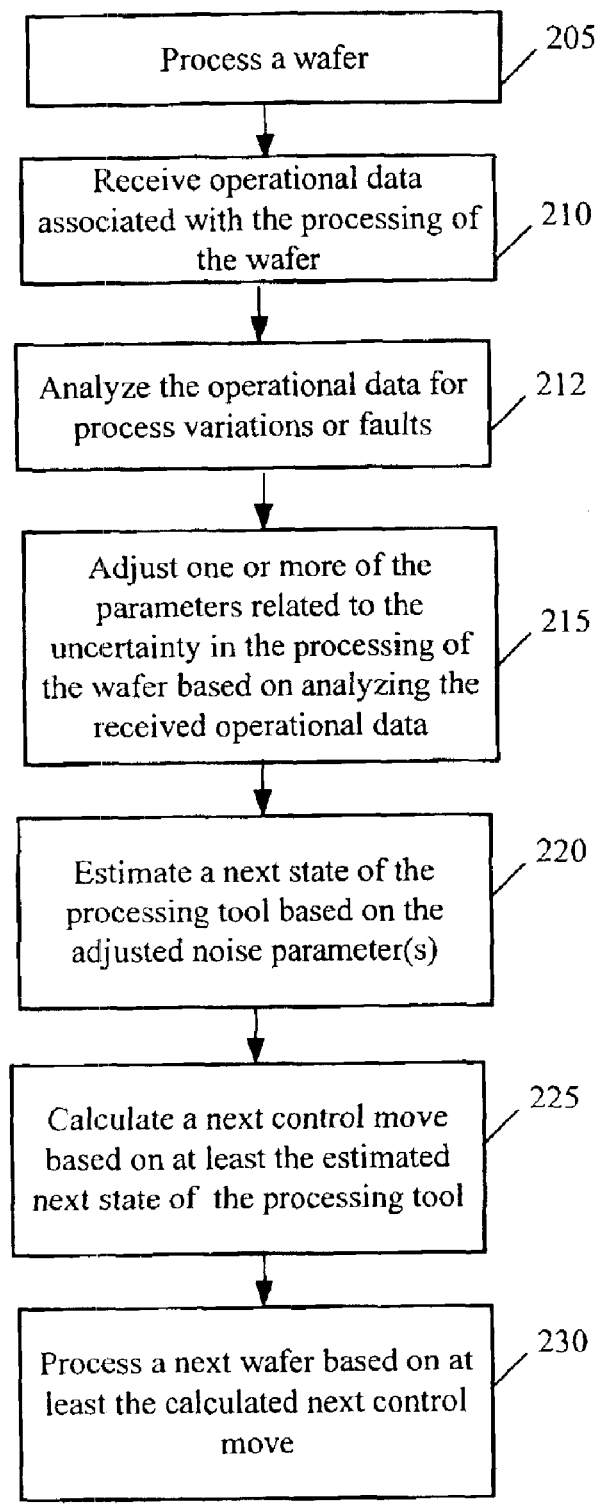
FIG. 2 illustrates a flow diagram of a method that may be implemented in the system of FIG. 1, in accordance with one embodiment of the present invention.

Referring now to FIG. 2, a flow diagram of a method that may be implemented in the system 100 of FIG. 1 is illustrated, in accordance with one embodiment of the present invention. The first processing tool 105 processes (at 205) a wafer. In one embodiment, the processing tool 105 may process a batch of wafers. As the wafer is processed (at 205), the processing tool 105 may provide operational data, in the form of metrology and/or trace data, associated with the processing of the wafer to the FDC unit 150. In another embodiment, the metrology tool 112 may provide metrology data associated with the processing of the wafer (at 205) to the FDC unit 150.

The FDC unit 150 receives (at 210) the operational data and analyzes (at 212) it to identify process variations or faults associated with the processing of the wafer. The act of analyzing the operational data (at 212) may include comparing at least a portion of the operational data to one or more fault models (not shown). In another embodiment, the act of analyzing the operational data (at 212) may include determining if the operational data (e.g., metrology data) indicates that values measured from the wafer are outside an acceptable range.

The FDC unit 150 adjusts (at 215) one or more of the parameters related to the uncertainty in the processing of the wafer based on analyzing the received operational data. The uncertainty in the process may be due to the presence of process noise, measurement noise, and the like. In one embodiment, these uncertainties may be expressed as elements of a covariance matrix (eg., matrix Q and/or matrix R). As such, adjusting (at 215) the one or more parameters related to the uncertainty in the process may include modifying (e.g., inflating or deflating) selected elements of one or more of the covariance matrices. In one embodiment, the selected elements of one or more of the covariance matrices may be updated in substantially real time.

An example of adjusting (at 215) the one or more parameters related to the uncertainty in the process is described herein. In the illustrated etch state space model described above, the state space model comprises two states, a shift state and a drift state. That is, the etching process in the illustrated example may shift and/or drift with time. The covariance matrices, Q and R, may be utilized to represent parameters (or events) in the process that cause the process to shift and/or drift. In particular, the individual elements of the covariance matrices Q and R may be appropriately weighted to represent the shift and drift in the process. In accordance with one embodiment of the present invention, the FDC unit 150 may identify, based on analyzing the operational data, the occurrences of selected events that may cause process drifts, shifts, or affect state estimates. The covariance matrices can be updated accordingly based on the fault detection analysis. If, for example, the FDC unit 150 determines the presence of an unstable power level associated with the process, and this instability may result, for instance, in a shift disturbance, the element(s) corresponding to the shift value in the covariance matrices may be adjusted accordingly relative to the other elements. As such, based on the adjusted covariance matrices, which take into account the presence of the unstable power level, the Kalman filter is be able to more accurately predict the next tool states. Similarly, the FDC unit 150 may detect other disturbances in the process that may require the covariance matrix or matrices to be updated. In one embodiment, the covariance matrices may be updated each time a new wafer batch is processed.

The estimator module 180 estimates (at 220) a next state of the processing tool 105 based on the adjusted parameter(s). The particular next state of the processing tool 105 that is estimated by the estimator module 180 will vary from one implementation to another. For example, if the processing tool 105 is an etching tool, the estimator module 180 may estimate the etch rate of the etching tool for the next wafer. If the processing tool 105, for example, is a deposition tool, the estimator module 180 may estimate the deposition rate of the deposition tool for the next wafer. Similarly, other types of next tool states may be predicted based on the particular context of the implementation. In one embodiment, the next processing tool state is provided to the control unit 155.

The control unit 155 calculates (at 225) a next control move based on at least the estimated next state of the processing tool 105. For example, if the estimated next state of the processing tool 105 corresponds to an etch rate of an etching tool, then, based on the estimated etch rate, the control unit 155 calculates an etching time needed to etch the next wafer. The accuracy of the next control move calculated by the control unit 155 depends in part on the accuracy of the underlying estimated next tool state. That is, the more accurate the underlying estimated next tool state, the more accurate the next control move is likely to be. In the illustrated embodiment, because the estimated next tool state is calculated based on the analysis of the operational data (see blocks 212, 215, and 220), the estimator module 180 may be able to more accurately predict the next tool state.

The control unit 155, in one embodiment, instructs the processing tool 105 to process (at 230) the next wafer according to at least the calculated next control move. For example, in the context of an etching tool, if the next control move is indicative of an etch time, the processing tool 105 etches the next wafer according to the time defined by the etch time. In one embodiment, the processing tool 105 may process (at 230) a batch of next wafers according to at least the calculated next control move.

In one embodiment, one or more of the acts described in the method of FIG. 2 can be implemented in substantially real time.

For reasons explained above, in accordance with one or more embodiments of the present invention, the estimator module 180 is able to more accurately predict the next processing tool 105 state based on the information provided by the FDC unit 150. For example, based on the information provided by the FDC unit 150, the estimator module 180 is able to take into account the presence of noise (or at least a portion thereof) in the process operation 102 when estimating the next tool state, thereby achieving more accurate tool state estimates. In one embodiment, selected elements of one or more of the covariance matrices may be adjusted (i.e., inflated or deflated) to account for process uncertainties, which allows the estimator module 180 to more accurately predict the next processing tool 105 state or process state. Thus, the ability to dynamically update the covariance matrices to account for process uncertainties based on the information from the FDC unit 150 can result in more accurate predictions of next tool or process states, as compared to predictions based on covariance matrices that are static or are otherwise impervious to variations in the process.

The various system layers, routines, or modules may be executable by the control units 155, 172 (see FIG. 1). As utilized herein, the term "control unit" may include a microprocessor, a microcontroller, a digital signal processor, a processor card (including one or more microprocessors or controllers), or other control or computing devices. The storage unit 174 (see FIG. 1) referred to in this discussion may include one or more machine-readable storage media for storing data and instructions. The storage media may include different forms of memory including semiconductor memory devices such as dynamic or static random access memories (DRAMs or SRAMS), erasable and programmable read-only memories (EPROMs), electrically erasable and programmable read-only memories (EEPROMS) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   receiving operational data associated with processing of a workpiece by a processing tool;
   performing fault detection analysis on at least a portion of the received operational data;
   determining at least a portion of noise associated with the processing of the workpiece based on analyzing the operational data;
   adjusting the determined portion of the noise based on the fault detection analysis; and
   estimating a next state of the processing tool based on at least the adjusted portion of the noise.

2. The method of claim 1, wherein receiving the operational data comprises receiving the operational data associated with the processing of a semiconductor wafer.

3. The method of claim 1, further comprising determining a control move based at least on the estimated next state of the processing tool.

4. The method of claim 3, further comprising processing a next workpiece based at least on the control move.

5. The method of claim 1, wherein determining at least the portion of the noise comprises determining at least one of a process noise and measurement noise associated with the processing of the workpiece.

6. The method of claim 5, wherein determining at least the portion of the noise comprises adjusting one or more elements of a covariance matrix based on analyzing the operational data.

7. The method of claim 6, wherein the covariance matrix represents at least one of a shift and drift in processing by the processing tool.

8. The method of claim 6, wherein adjusting the one or more elements of the covariance matrix comprises at least one of inflating or deflating the elements of the covariance matrix.

9. The method of claim 1, wherein receiving the operational data comprises receiving the operational data associated with processing of a plurality of workpieces by the processing tool.

10. An apparatus, comprising:
    an interface adapted to receive operational data associated with processing of a workpiece by a processing tool; and
    a control unit communicatively coupled to the interface, the control unit adapted to:
        determine at least a portion of noise associated with the processing of the workpiece based on analyzing the operational data;
        adjust the determined portion of the noise based on fault detection analysis that is performed based on at least a portion of the received operational data; and
        estimate a next state of the processing tool based on at least the adjusted portion of the noise.

11. The apparatus of claim 10, wherein the control unit is adapted to receive the operational data associated with the processing of a semiconductor wafer.

12. The apparatus of claim 11, wherein the control unit is adapted to determine a control move based at least on the estimated next state of the processing tool.

13. The apparatus of claim 12, wherein the control unit is adapted to process a next workpiece based at least on the control move.

14. The apparatus of claim 10, wherein the control unit is adapted to determine at least one of a process noise and measurement noise associated with the processing of the workpiece.

15. The apparatus of claim 14, wherein the control unit is adapted to adjust one or more elements of a covariance matrix based on analyzing the operational data.

16. The apparatus of claim 15, wherein the control unit is adapted to estimate the next state based at least on the covariance matrix that represents at least one of a shift and drift in the processing by the processing tool.

17. An apparatus, comprising:
    means for receiving operational data associated with processing of a workpiece by a processing tool;
    means for analyzing, using a fault detection unit, at least a portion of the received operational data to determine a process variation associated with the processing of the workpiece;
    means for determining at least a portion of noise associated with the processing of the workpiece based on analyzing the operational data;
    means for adjusting the determined portion of the noise based on the determined process variation; and
    means for estimating a next state of the processing tool based on at least the adjusted portion of the noise.

18. An article comprising one or more machine-readable storage media containing instructions that when executed enable a processor to:

receive operational data associated with processing of a workpiece by a processing tool;

adjust one or more noise parameters associated with the processing of the workpiece based on analyzing the operational data and based on fault detection analysis that is performed based on at least a portion of the received operational data; and estimate a next state of the processing tool based on at least the one or more adjusted noise parameters.

19. The article of claim 18, wherein the instructions when executed enable the processor to generate a control move based at least on the estimated next state of the processing tool.

20. The article of claim 19, wherein the instructions when executed enable the processor to process a next workpiece based at least on the control move.

21. The article of claim 18, wherein the instructions when executed enable the processor to adjust one or more elements of a covariance matrix related to a level of uncertainty in the processing of the workpiece.

22. The article of claim 18, wherein the instructions when executed enable the processor to adjust the one or more parameters based on detecting a fault associated with the processing of the workpiece.

23. The article of claim 18, wherein the instructions when executed enable the processor to estimate a next each rate.

24. The article of claim 18, wherein the instructions when executed enable the processor to receive operational data associated with the processing of a semiconductor wafer.

25. A system, comprising:

a processing tool adapted to provide operational data associated with processing of a workpiece;

control unit adapted to:

receive the operational data;

determine at least a portion of noise associated with the processing of the workpiece based on analyzing the operational data;

adjust the determined portion of the noise based on fault detection analysis that is performed based on at least a portion of the received operational data; and estimate a next state of the processing tool based on at least the adjusted portion of the noise.

26. The system of claim 25, wherein the control unit is associated with a fault detection and classification unit, further comprising an advanced process control framework coupled between the processing tool and the fault detection and classification unit.

\* \* \* \* \*